US009841594B2

(12) United States Patent
Lee et al.

(10) Patent No.: US 9,841,594 B2
(45) Date of Patent: Dec. 12, 2017

(54) APPARATUS OF COUPLING SUBSTRATES FOR ELECTROWETTING DISPLAY PANEL AND METHOD OF COUPLING SUBSTRATES FOR ELECTROWETTING DISPLAY USING THE SAME

(71) Applicant: Amazon Technologies, Inc., Reno, NV (US)

(72) Inventors: Kwangho Lee, Seoul (KR); Myunghwan Park, Seoul (KR); Jinbo Shim, Seoul (KR); Choisang Park, Seoul (KR); Jae-Jin Lyu, Yongin-si (KR)

(73) Assignee: Amazon Technologies, Inc., Reno, NV (US)

( * ) Notice: Subject to any disclaimer, the term of this patent is extended or adjusted under 35 U.S.C. 154(b) by 496 days.

(21) Appl. No.: 14/015,710

(22) Filed: Aug. 30, 2013

(65) Prior Publication Data

US 2014/0075742 A1  Mar. 20, 2014

(30) Foreign Application Priority Data

Sep. 3, 2012 (KR) .................. 10-2012-0097166

(51) Int. Cl.
*H05K 13/00* (2006.01)
*G02B 26/00* (2006.01)
*B05D 5/06* (2006.01)

(52) U.S. Cl.
CPC ............ *G02B 26/005* (2013.01); *B05D 5/06* (2013.01); *Y10T 29/49002* (2015.01); *Y10T 29/52* (2015.01); *Y10T 29/5317* (2015.01)

(58) Field of Classification Search
CPC ................................. G02B 26/005; B05D 5/06
USPC .................... 29/738, 743, 729, 830, 592.1
See application file for complete search history.

(56) References Cited

U.S. PATENT DOCUMENTS

| 5,297,480 | A  | * | 3/1994  | Miyashita | ............... | B29C 33/02 100/320 |
| 5,688,150 | A  | * | 11/1997 | Seidler    | .................. | H01R 12/57 439/876 |
| 6,646,689 | B2 | * | 11/2003 | Matsuda   | ............... | G02F 1/1333 349/1 |
| 6,922,229 | B2 | * | 7/2005  | Yawata    | .................. | B32B 37/10 349/187 |
| 6,991,699 | B2 | * | 1/2006  | Lee       | ..................... | B32B 37/0046 156/285 |
| 7,675,665 | B2 | * | 3/2010  | Hagood    | ................. | G02B 26/02 359/233 |
| 7,765,682 | B2 | * | 8/2010  | Hwang     | ............ | H01L 21/67092 269/21 |
| 7,839,477 | B2 | * | 11/2010 | Kim       | ..................... | G02F 1/1303 349/149 |

(Continued)

*Primary Examiner* — Peter DungBa Vo
*Assistant Examiner* — Kaying Kue
(74) *Attorney, Agent, or Firm* — Lee & Hayes, PLLC (57) ABSTRACT

An apparatus that couples a first substrate and a second substrate of an electrowetting display panel, the apparatus comprising a first chuck provided with a first support surface and a second chuck provided with a second support surface opposite to the first support surface and positioned beneath the first chuck. The second support surface is smaller than the first support surface and is positioned in a plane parallel to a plane that includes the first support surface.

18 Claims, 5 Drawing Sheets

(56) References Cited

U.S. PATENT DOCUMENTS

| | | | |
|---|---|---|---|
| 7,861,913 B2* | 1/2011 | Miyazaki | H01L 24/75 156/311 |
| 8,333,009 B2* | 12/2012 | Hirata | B32B 38/1833 228/180.21 |
| 9,335,539 B2* | 5/2016 | Shian | G02B 3/12 |
| 2003/0063251 A1* | 4/2003 | Murata | G02F 1/1339 349/189 |
| 2003/0145459 A1* | 8/2003 | Yamamoto | H01L 21/67092 29/830 |
| 2003/0145943 A1* | 8/2003 | Lee | B32B 37/0046 156/285 |
| 2003/0178468 A1* | 9/2003 | Lee | G02F 1/1333 228/102 |
| 2003/0223030 A1* | 12/2003 | Byun | G02F 1/1303 349/187 |
| 2004/0145698 A1* | 7/2004 | Yokoue | G02F 1/1341 349/190 |
| 2005/0034302 A1* | 2/2005 | Hosotani | B23K 3/087 29/840 |
| 2005/0226780 A1* | 10/2005 | Sandell | B01L 3/5027 422/400 |
| 2008/0002137 A1* | 1/2008 | Kim | G02F 1/1303 349/187 |
| 2008/0040916 A1* | 2/2008 | Shim | G02F 1/1341 29/729 |
| 2009/0139960 A1* | 6/2009 | Kim | B82Y 10/00 216/24 |
| 2010/0045649 A1* | 2/2010 | Boom | G02B 26/004 345/211 |
| 2010/0053535 A1* | 3/2010 | Kim | G02F 1/13394 349/155 |
| 2011/0155318 A1* | 6/2011 | Shibata | G02F 1/1303 156/275.5 |
| 2012/0008056 A1* | 1/2012 | Gong | G02B 27/2214 349/15 |
| 2013/0319608 A1* | 12/2013 | Choi | H05B 33/10 156/273.3 |
| 2013/0335805 A1* | 12/2013 | Dean | G02B 26/005 359/290 |
| 2014/0002975 A1* | 1/2014 | Lee | H05K 5/0017 361/679.01 |
| 2014/0355101 A1* | 12/2014 | Shian | G02B 3/12 359/290 |

* cited by examiner

APPARATUS OF COUPLING SUBSTRATES FOR ELECTROWETTING DISPLAY PANEL AND METHOD OF COUPLING SUBSTRATES FOR ELECTROWETTING DISPLAY USING THE SAME

CROSS REFERENCE TO RELATED PATENT APPLICATIONS

The present application claims priority to Republic of Korea Patent Application No. 10-2012-0097166, entitled "Apparatus of Joining Substrates for Electrowetting Display Panel and Method of Joining Substrates for Electrowetting Display Using the Same," filed Sep. 3, 2012, which is incorporated herein by reference in its entirety.

FIELD OF THE INVENTION

The present disclosure relates to flat panel display devices, and more particularly to an apparatus for coupling substrates for an electrowetting display panel that is configured to display images using electrowetting techniques, as well as a method for coupling the substrates using the apparatus.

BACKGROUND

Flat panel display devices include liquid crystal displays (LCDs), plasma display panels (PDPs), organic light emitting displays (OLEDs), field effect displays (FEDs), eletrophoretic displays (EPDs), and electrowetting displays (EWDs). An electrowetting display device includes an electrowetting display panel that displays images using electrowetting techniques.

An electrowetting display panel generally includes a first substrate provided with a first electrode, a second substrate provided with a second electrode and facing the first substrate, and an electrowetting layer interposed between the first substrate and the second substrate. The electrowetting layer generally includes fluids that do not mix with each other. One of the fluids has electrical conductivity or polarity, and at least one of the fluids has optical properties such as absorbing, reflecting or filtering light rays. Therefore, images can be displayed by controlling the optical characteristics of the light with the electrowetting layer, wherein the relative positions of the fluids are controlled using the electric field formed between the first and the second electrodes.

To manufacture such an electrowetting display panel, the fluids are provided on one of the first substrate or the second substrate and then the first substrate and the second substrate are coupled together. Since the fluids do not mix with each other but actually repel each other, a portion of the fluids may not be retained between the first substrate and the second substrate and may actually be expelled out from between the first substrate and the second substrate. The expelled fluids can contaminate an apparatus used for coupling the substrates and/or raise the manufacturing cost due to unnecessary waste of the fluids.

SUMMARY

An apparatus used to couple a first substrate and a second substrate of an electrowetting display panel, according to an embodiment of the present disclosure, comprises a first chuck provided with a first support surface and a second chuck provided with a second support surface opposite to the first support surface and positioned beneath the first chuck. In addition, the second support surface is smaller than the first support surface and is positioned in a plane that is parallel to a plane that includes the first support surface.

A method of coupling substrates of electrowetting display panels using an apparatus for coupling the substrates in accordance with the present disclosure comprises supporting a first substrate on a first chuck having a first support surface. A second substrate having a smaller size than the first substrate is supported on a second chuck having a second support surface. Fluids used for pixels of the electrowetting display panel are provided on one of the first substrate or the second substrate. Then, the first substrate and the second substrate are coupled by driving at least one of the first chuck and the second chuck. When the first substrate and the second substrate have been coupled together, a portion of the first substrate is exposed to relative to the second substrate and interrupts the fluid from flowing towards the first chuck.

According to the embodiments of the present disclosure, the chucks of the coupling apparatus can be protected from being contaminated by the fluid overflowing from the cell gaps of the electrowetting display panel at the coupling process of the substrates. Therefore, the substrates can be separated from the chucks easily after being coupled.

In addition, according to an embodiment of the present disclosure, an overflowing channel for the fluids can be defined using the structure of the apparatus for coupling substrates, which in turn enables reuse or recycling of overflown fluids by an appropriate handling means.

In addition, according to an embodiment of the present disclosure, the apparatus for coupling substrates can further comprise a nozzle for injecting fluid and a press that couples the substrates. As such, the apparatus for coupling substrates in accordance with the present disclosure can perform the processes of attaching the first and second substrates, providing fluids, and coupling the first and second substrates in a single station.

BRIEF DESCRIPTION OF THE DRAWINGS

FIG. 4 is an enlarged view of the lateral side of the apparatus for coupling substrates illustrated in FIG. 2a.

DETAILED DESCRIPTION

A detailed description of the present disclosure is provided hereinbelow by referring to the accompanying drawings. The present disclosure is not limited to the embodiments provided here but can be implemented in various ways. Rather, the embodiments set forth and described hereinafter are provided to help the present disclosure to be understood easily and clearly, and to provide persons skilled in the art with sufficient information related with the present disclosure. This disclosure should not be construed as limited to the embodiments set forth herein. The same numbers and symbols are used with the same parts and components in the description of the embodiments and the drawings.

Figure 1:
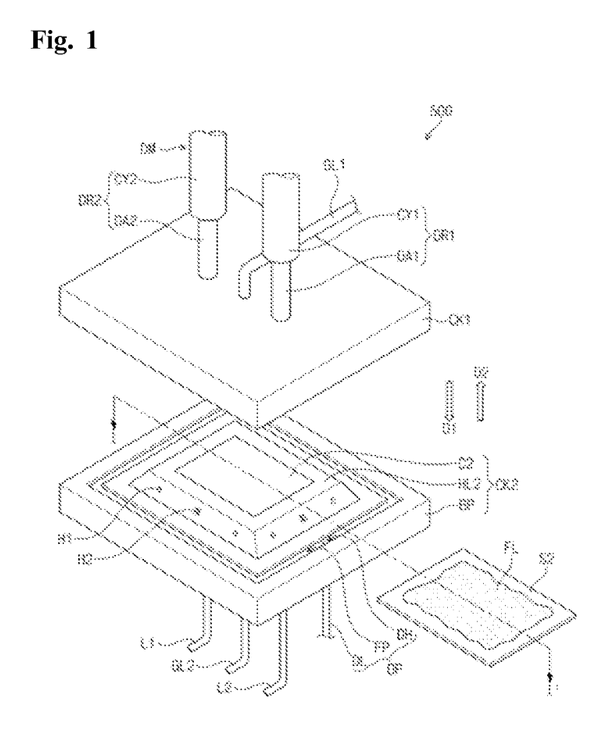
FIG. 1 is a perspective view of an apparatus for coupling substrates in accordance with an embodiment of the present disclosure.
Figure 2A:
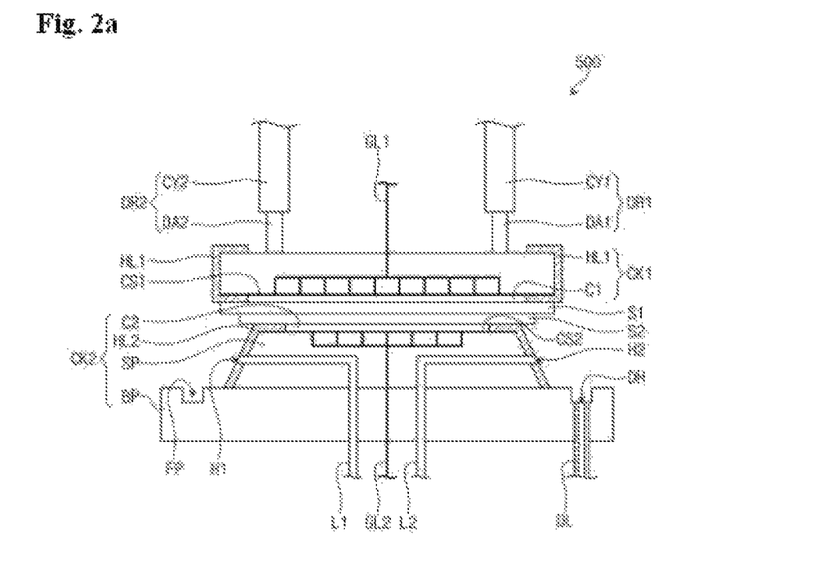
FIG. 2a is a cross-sectional view taken from line 1-1' of FIG. 1.
Figure 2B:
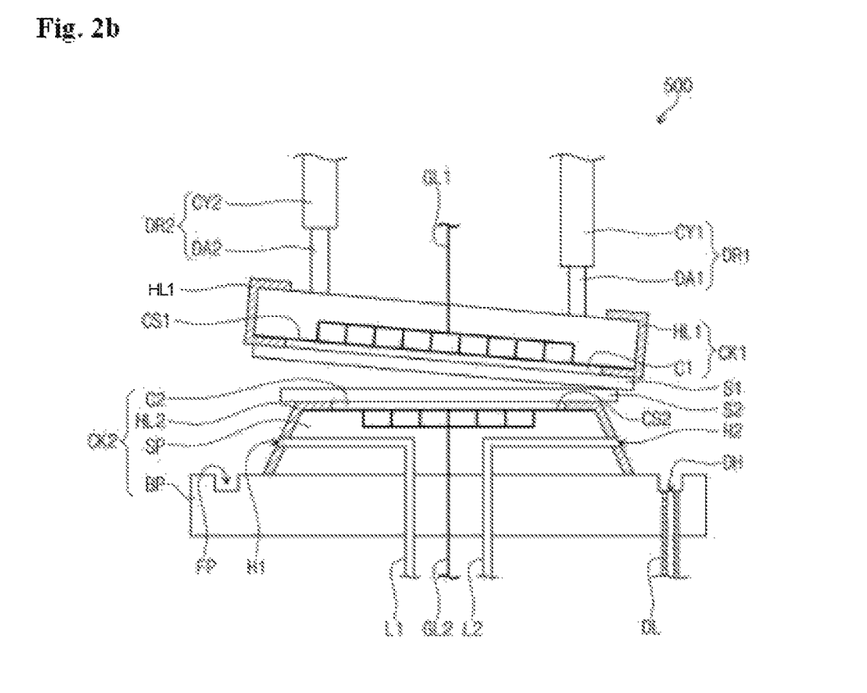
FIG. 2b shows the operation of the apparatus for coupling substrates.
Figure 4:
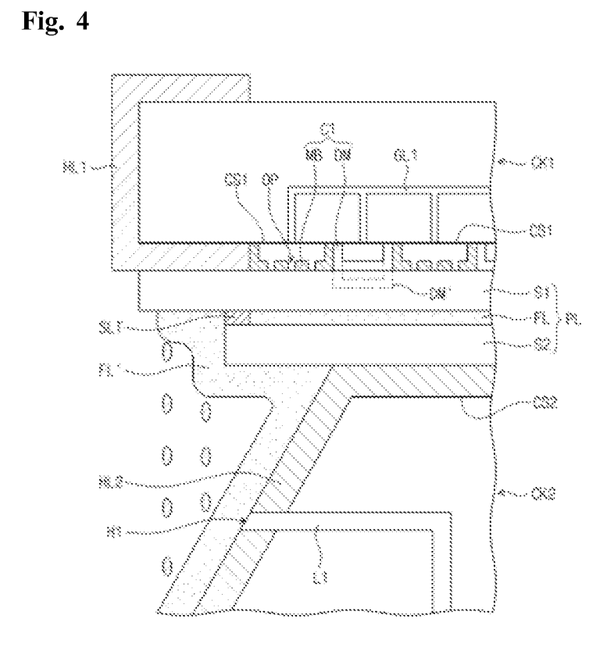

Referring to FIG. 1, FIG. 2a and FIG. 2b, an apparatus 500 for coupling substrates couples a first substrate S1 and a second substrate S2 of the electrowetting display panel PL of FIG. 4. The electrowetting display panel generally comprises the first substrate S1 on which a plurality of pixel electrodes are formed, the second substrate S2 on which common electrodes are formed, and fluids interposed between the first substrate S1 and the second substrate S2.

In embodiments of the present disclosure, the fluids generally comprise a nonpolar fluid (not illustrated) and a polar fluid FL having electrical polarity. The nonpolar fluid can be a colored oil or a black oil, while the polar fluid FL can be a solution of water and ethyl alcohol with dissolved potassium chloride, or water with dissolved potassium chloride. In addition, the polar fluid FL can be a mixed solution of ethylene glycol and glycerol. In such an embodiment, the mixing ratio of the ethylene glycol and glycerol can be from approximately 6.5:3.5 to 7.5:2.5 in order to improve the speed of response and reliability of the electrowetting display panel.

The apparatus 500 for coupling substrates comprises a first chuck CK1, a second chuck CK2, a drain portion DP and a driving member DM. In operation, the apparatus 500 for coupling substrates couples the second substrate S2 onto the first substrate S1, wherein the first substrate S1 includes the polar fluid FL and the nonpolar fluid on a surface.

The first chuck CK1 is provided with a first support surface CS1 and the first substrate S1 is supported on the first support surface CS1. In an embodiment of the present disclosure, the first chuck CK1 generally includes a first chucking member C1 that is provided on the first support surface CS1 so that the first chuck CK1 can support the first substrate S1 easily. The first chucking member C1 is connected to a first gas line GL1. As such, the first chucking member C1 is configured to pull or push the first substrate S1 by using a suction force generated by the flow of gas in the first gas line GL1. A further description of the first chucking member C1 is provided herein with reference to FIG. 4.

In an embodiment of the present disclosure, the first chuck CK1 further comprises a first hydrophobic layer HL1 that is formed on the first support surface CS1. The first hydrophobic layer HL1 is generally isolated from the first chucking member C1 and formed on the first chuck CK1 that comprises the first support surface CS1. The first hydrophobic layer HL1 is generally formed closer to the edge of the first support surface CS1 than the first chucking member C1. In an embodiment of the present disclosure, the first hydrophobic layer HL1 comprises a hydrophobic material such as Teflon. As such, when coupling the first substrate S1 and the second substrate S2 using the apparatus 500 for coupling substrates, problems associated with the polar fluid FL failing to remain between the first substrate S1 and the second substrate S2 and overflows from between the first substrate S1 and the second substrate S2 can be reduced. For example, one problem is that the effluent polar fluid FL generally contaminates the surface of the first chuck CK1.

The second chuck CK2 is positioned beneath the first chuck CK1 and the second chuck CK2 can be supported by a stage (not illustrated) placed beneath it. The second chuck CK2 comprises a support part SP that has a second support surface CS2 opposing the first support surface CS1 and a bottom part BP. The second support surface is included in a plane that is parallel to a plane that includes the first support surface CS1.

The support part SP comprises the second support surface CS2 and supports the second substrate S2. In an embodiment of the present disclosure, the width of the support part SP increases in proportion to the distance from the second support surface CS2. Thus, the support part SP can have a tapered shape.

The bottom part BP is positioned beneath the support part SP. A portion of the bottom part BP overlaps the support part SP to support the support part SP, while the other portion of the bottom part BP can be exposed to the outside and not overlapping the support part SP. For example, the center area of the bottom part BP overlaps the support part SP, while the circumferential portion of the bottom part BP can be exposed to the outside.

In an embodiment of the present disclosure, the second chuck CK2 comprises a second chucking member C2 provided on the second support surface CS2. The second chucking member C2 can be connected to a second gas line GL2 and in such an embodiment, the second chucking member C2 is configured to pull or push the second substrate S2 using the gas flow in the second gas line GL2.

In an embodiment of the present disclosure, the second chuck CK2 further comprises a second hydrophobic layer HL2 formed on the second support surface CS2. The second hydrophobic layer HL2 is generally isolated from the second chucking member C2 and formed on the surface of the second chuck CK2 that comprises the second support surface CS2. More particularly, the second hydrophobic layer HL2 is generally positioned closer to the edge of the second support surface CS2 than the second chucking member C2 and is further implemented on the side surface of the support part SP. The second hydrophobic layer HL2, just like the first hydrophobic layer HL1, generally comprises a hydrophobic material such as Teflon.

A drain portion DP comprises a flow path FP, a drain hole DH and a drain line DL. In an embodiment of the present disclosure, the flow path FP can be a groove formed at a predetermined depth on the upper surface of the bottom part BP exposed to the outside of CK1. The flow path FP can be extended along a portion of the bottom part BP exposed to the outside of CK1. The drain hole DH is connected to the flow path FP penetrating through the bottom part BP. The drain line DL is connected to the drain hole DH.

According to the configuration of the drain portion DP, when the first substrate S1 and the second substrate S2 are coupled together, polar fluid (FL' of FIG. 4) that has overflowed outside may fall as drops onto the bottom part BP exposed to the outside of CK1, or may flow along the side of the support part SP having a tapered shape and onto the bottom part BP exposed to the outside of CK1.

When the polar fluid FL reaches the bottom part BP from the paths described above, the polar fluid FL can be accommodated in the flow path FP and flow along the path provided by the flow path FP. The polar fluid FL flowing in the path provided by the flow path FP can be drained out through the drain hole DH or drain line DL. In such a situation, an apparatus (not illustrated) that treats the drained polar fluid FL for recycling can be connected to the drain line DL.

In an embodiment of the present disclosure, the flow path FP can be configured to be sloped towards the drain hole DH. Thus, the polar fluid FL in the flow path FP can flow to the drain hole DH. In addition, at least a portion of the bottom part BP can be configured to be sloped towards the flow path FP. Thus, the polar fluid FL that reaches the bottom part BP can be accommodated in the flow path FP.

In addition, the second chuck CK1 can be positioned on the side of the support part SP and further comprise jets that dispense fluid for washing and drying the second chuck CK2. In this embodiment, the jets can be implemented with a first hole H1 and a second hole H2 that are provided on the side part SP of the support part SP. The first hole H1 is connected to a first feed line L1 and the second hole H2 is connected to a second feed line L2.

As such, washing fluid externally supplied can be fed to the second chuck CK2 via the first feed line L1 and the first hole H1. Drying gas externally supplied can be fed to the second chuck CK2 via the second feed line L2 and the second hole H2. In an embodiment of the present disclosure, the washing fluid can be distilled water (DW), deionized water (DIW), isopropyl alcohol (IPA), or ethanol, and the drying gas can be air or nitrogen gas.

In another embodiment of the present disclosure, the first feed line L1 and the second feed line L2 each can be coupled to a nozzle (not illustrated), respectively, and the nozzles can be installed in the first hole H1 and the second hole H2, respectively.

The drive member DM is coupled with the first chuck CK1 to move the first chuck CK1 close to or away from the second chuck CK2. In an embodiment of the present disclosure, the drive member DM comprises a first driver DR1 and a second driver DR2. The first driver DR1 and the second driver DR2 each are coupled with a cylinder and a drive shaft coupled to the cylinder to provide linear motion, respectively.

More particularly, the first driver DR1 is coupled to an end of the first chuck CK1 and the first driver DR1 comprises a first cylinder CY1 and a first drive shaft DA1. In addition, the second driver DR2 is coupled to the other end of the first chuck CK1 and the second driver DR2 comprises a second cylinder CY2 and a second drive shaft DA2.

When the first drive shaft DA1 moves linearly in a first direction D1 driven by the first driver DR1, the first chuck CK1 can move closer to the second chuck CK2. In contrast, when the second drive shaft DA2 driven by the second driver DR2 moves linearly in a second direction D2 opposite to the first direction D1, the first chuck CK1 can move away from the second chuck CK2.

The first driver DR1 and the second driver DR2 can be driven independently, as illustrated in FIG. 2b. As such, when the second drive shaft DA2 moves linearly in the second direction D2 after the first drive shaft DA1 has moved linearly in the first direction D1, the first substrate S1 can be coupled with the second substrate S2 progressively from one end to the other end. Thus, air bubbles in the polar fluid FL can be removed from end to end and polar fluid FL can be discharged from between the first substrate S1 and the second substrate S2, which can remove the air bubbles contained in the polar fluid FL interposed between the first substrate S1 and the second substrate S2.

In another embodiment of the present disclosure, the drive member DM drives the first chuck CK1 in a different manner. For example, the first chuck CK1 can be coupled to an end of the second chuck CK2 with a hinge. In this embodiment, the drive member DM can move the first chuck CK1 rotating around the second chuck CK2.

When coupling the second substrate S2 to the first substrate S1 while the polar fluid FL is provided on the first substrate S1 using the apparatus 500 for coupling substrates, a portion of the polar fluid FL can be interposed between the first substrate S1 and the second substrate S2, while the rest of the polar fluid FL can be expelled from between the first substrate S1 and the second substrate S2. In this situation, the flow of the polar fluid FL expelled out must be controlled to protect the first chuck CK1 and the second chuck CK2 from being contaminated by the polar fluid FL. To this end, in an embodiment of the present disclosure, the first chuck CK1 and the second chuck CK2 can be designed in accordance with a design standard that will be described herein with reference to FIG. 3, in order for easy control of the effluent polar fluid (FL' of FIG. 4).

Figure 3:
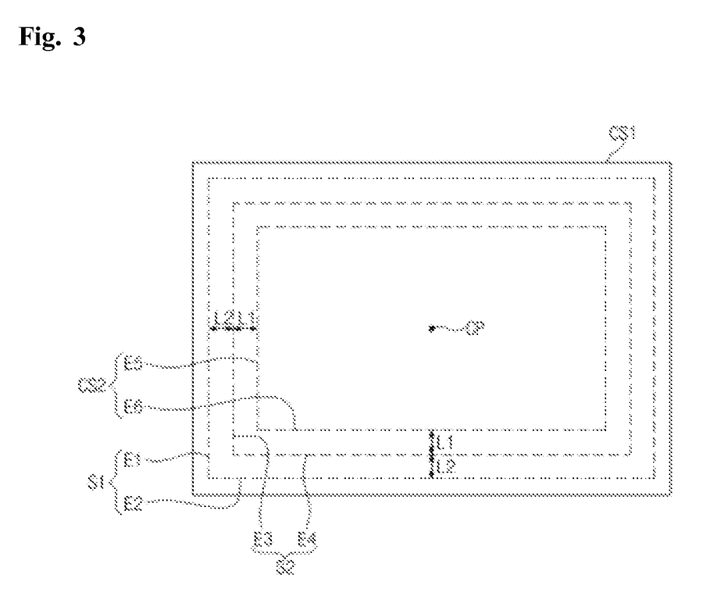
FIG. 3 is a plan view showing the support surfaces of the chucks of the apparatus for coupling substrates illustrated in FIG. 2a and the two substrates supported by the support surfaces.

Referring to FIGS. 2a and 3, the first support surface CS1 of the first chuck CK1, the second support surface CS2 of the second chuck CK2, the first substrate S1 and the second substrate S2 can be arranged on parallel planes with reference to a point CP that is the center of gravity. The comparison of the sizes of the first support surface CS1, the second support surface CS2, the first substrate S1 and the second substrate S2 is described below.

First, the second substrate S2 is included on the first substrate S1 to define a common plane between the first substrate S1 and the second substrate S2. The second substrate S2 generally has a size smaller than the size of the first substrate S1 such that an outer portion of the first substrate S1 extends beyond the second substrate S2 when the first substrate S1 and the second substrate S2 are coupled with each other. More particularly, in an embodiment of the present disclosure, the first substrate S1 and the second substrate S2 are rectangles. The first substrate S1 can be defined with four sides including the first side E1 and the second side E2, while the second substrate S2 can be defined with four sides including the third side E3 and the fourth side E4.

In an embodiment of the present disclosure, when defining the sides of the first substrate S1 and the second substrate S2 as described above, the four sides defining the first substrate S1 and the four sides defining the second substrate S2 can correspond on a one-to-one basis and be separated by from about 0.5 mm to 100 mm from each other on a plane. For example, the distance L2 between the first side E1 and the third side E3 can be from about 0.5 mm to 100 mm and the distance L2 between the second side E2 and the fourth side E4 can be from about 0.5 mm to 100 mm.

The outer portion of the first substrate S1 that extends beyond the second substrate S2 when the first substrate S1 and the second substrate S2 have been coupled with each other can guide the polar fluid (FL' of FIG. 4) that overflows from between the first substrate S1 and the second substrate S2 when the two are coupled to the drain portion (DP of FIG. 1). Therefore, the first chuck CK1 can be protected from being contaminated by the effluent polar fluid FL.

In addition, the second support surface CS2 is positioned on the second substrate S2 to define a common plane between the second substrate S2 and the second support surface CS2. The second support surface CS2 is generally smaller than the second substrate S2. More particularly, in an embodiment of the present disclosure, the second support surface CS2 can be a rectangle. In this embodiment, the second substrate S2 can be defined with four sides including the fifth side E5 and the sixth side E6.

In this embodiment, the four sides defining the second support surface CS2 can correspond to the four sides that define the second substrate S2 and can be separated by from about 0.5 mm to 100 mm on a common plane. For example, the distance L1 between the third side E3 and the fifth side E5 can be from about 0.5 mm to 100 mm and the distance L1 between the fourth side E4 and the sixth side E6 can be from about 0.5 mm to 100 mm.

When the first and second distances L1 and L2 are less than 0.5 mm, the effluent polar fluid (FL' of FIG. 4) may move to the first substrate S1 and contaminate the first chuck CK1. However, if the first and second distances L1 and L2 are greater than 100 mm, the size of the first substrate S1 can be excessive, which may result in problems in other processes other than the second substrate coupling process due to the excessive size of the first substrate S1.

Since the second substrate S2 is larger than the second support surface CS2 along the defined plane, an outer portion of the second substrate S2 may be exposed relative to the second support surface CS2, as illustrated in FIG. 2a and FIG. 2b. As a result, when coupling the first substrate S1 and the second substrate S2 using the apparatus 500 for coupling substrates, the effluent polar fluid may fall from the edge of the second substrate S2 onto the drain portion (DP of FIG. 1), or flow into the drain portion along on the side of the support part (SP of FIG. 2a) of the first chuck CK1. As a result, the second support surface CS2 is protected from being contaminated by the effluent polar fluid FL that would otherwise reach the second support surface CS2.

In addition, in an embodiment of the present disclosure, the size of the first support surface CS1 can be the same or greater than the size of the first substrate S1. As such, the distance between the first side E1 of the first support surface CS1 and the fifth side E5 of the second support surface CS2 neighboring the first side E1 can be at least 1 mm. In addition, the distance can be 100 mm or less to help prevent the problems in other processes as mentioned above.

If the size of the first substrate S1 is greater than that of the first support surface CS1, the outer portion of the first substrate S1 is not covered by the first support surface CS1 and is thus exposed. As a result, the effluent polar fluid can flow to the first support surface CS1 along the outer portion of the first substrate S1. In the embodiments of the present disclosure, the size of the first support surface CS1 is generally the same or greater than that of the first substrate S1. Furthermore, the first hydrophobic layer (HL1 of FIG. 2a) that is not easily wetted by the polar fluid is provided on the outer portion of the first support surface CS1 to protect the first support surface CS1 from being contaminated by the polar fluid.

Referring to FIG. 4, the first chucking member C1 is provided on the first support surface CS1. The first chucking member C1 supports the first substrate S1 on the first support surface CS1, or pushes the first substrate S1 to separate the first substrate S1 from the first support surface CS1. In an embodiment of the present disclosure, the first chucking member C1 can comprise a membrane MB formed with a plurality of openings OP and a diaphragm DM. The membrane MB and the diaphragm DM can be connected to the first gas line GL1, respectively.

According to the configuration of the first chucking member C1 described above, when gas, for example, nitrogen gas, is supplied to the membrane MB and the diaphragm DM via the first gas line GL1, and to the first substrate S1 via the plurality of openings OP, the volume of the diaphragm DM increases as indicated with a virtual line DM'. Accordingly, the membrane MB and the diaphragm DM push the first substrate S1 so that the first substrate S1 can be separated from the first support surface CS1.

Conversely, when the gas filled in the first gas line GL1 is sucked out from the outside, the suction force generated by the gas flow is transferred to the first substrate S1 via the plurality of openings OP and the first substrate S1 can be supported on the first support surface CS1.

If the first chucking member C1 is a different type, for example, an electrostatic chuck, the electrical characteristics of the electrostatic force may be neutralized by the polar fluid. Since the first chucking member C1, in an embodiment of the present disclosure, supports the first substrate S1 using gas, the first substrate S1 can be supported stably using the first chucking member C1 even when the first chucking member C1 is exposed to the polar fluid.

Figure 5:
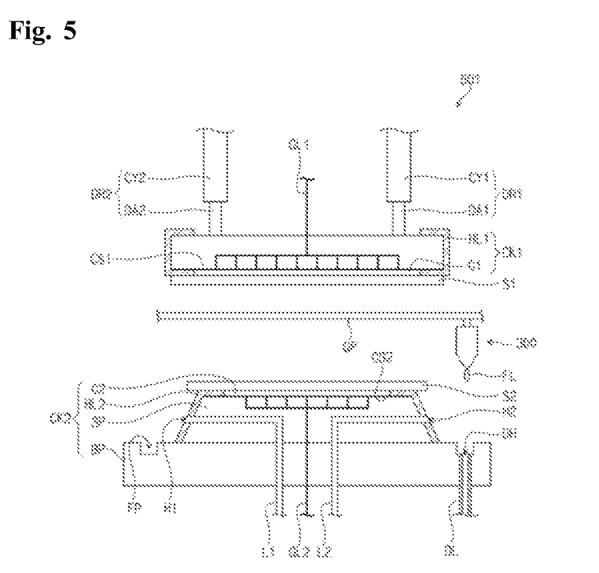
FIG. 5 is a cross-sectional view of an apparatus for coupling substrates in accordance with another embodiment of the present disclosure.

FIG. 5 is a cross-sectional view of an apparatus 501 for coupling substrates in accordance with another embodiment of the present disclosure. In the description of FIG. 5, the components described with respect to the earlier embodiments are indicated by the numbering scheme of the drawings and the components are not further described again.

Referring to FIG. 5, the apparatus 501 for coupling substrates further comprises a nozzle 300 when compared to the apparatus 500 for coupling substrates. The nozzle 300 is coupled to the guide part GP that crosses the second substrate S2. The path of the nozzle 300 is guided by the guide part GP to provide polar fluid FL onto the second substrate S2 which is supported by the second chuck CK2.

During a manufacturing process, the polar fluid FL can be applied on the second substrate S2 using the nozzle 300 before coupling the first substrate S1 and the second substrate S2. As a result, the process of coupling the first substrate S1 and the second substrate S2, as well as the process of providing the polar fluid FL, can be performed with the apparatus 501 for coupling substrates.

Figure 6:
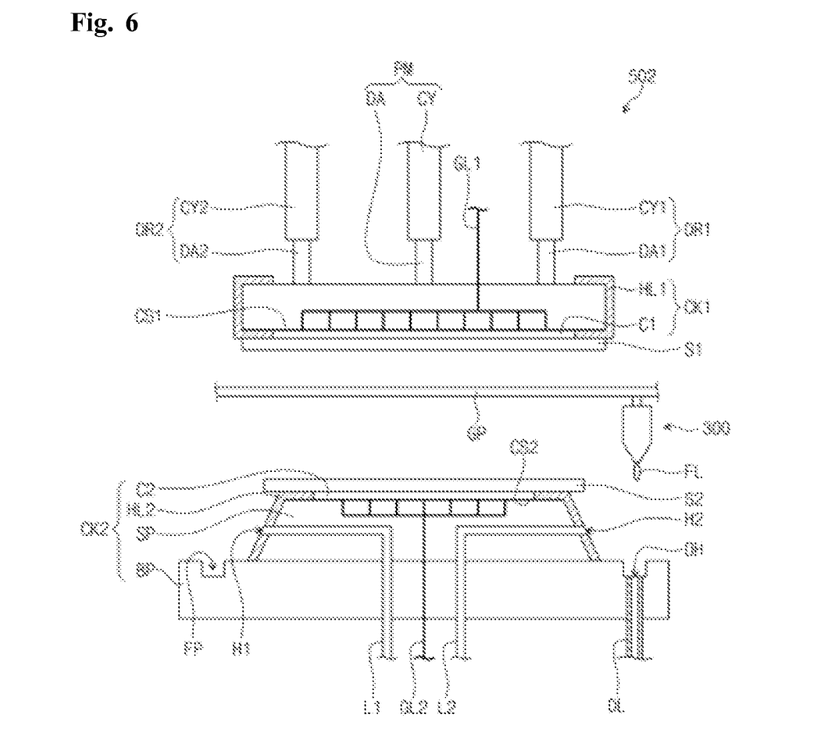
FIG. 6 is a cross-sectional view of an apparatus for coupling substrates in accordance with still another embodiment of the present disclosure.

FIG. 6 is a cross-sectional view of an apparatus 502 for coupling substrates in accordance with still another embodiment of the present disclosure. In the description of FIG. 6, the components described with respect to the earlier embodiments are indicated by the numbering scheme of the drawings and the components are not further described again.

Referring to FIG. 6, the apparatus 502 for coupling substrates further comprises a press PM when compared to the apparatus 501 for coupling substrates. The press PM is coupled to the first chuck CK1 to press and couple the first substrate S1 and the second substrate S2, which have been brought in contact with each other by the first chuck CK1 and the second chuck CK2.

In an embodiment of the present disclosure, the press PM comprises a cylinder CY and a drive shaft DA that moves linearly inside the cylinder CY and can be driven independently from the first driver DR1 and the second driver DR2. In addition, the drive shaft DA can be coupled to the center of the first chuck CK1 so that the pressure applied to the first substrate S1 and the second substrate S2 by the press PM is distributed evenly.

During a manufacturing process, the first substrate S1 and the second substrate S2 are coupled using the press PM after bringing the first substrate S1 and the second substrate S2 into contact using the first chuck CK1 and the second chuck CK2. As such, the apparatus 502 for coupling substrates can perform the processes of providing the polar fluid FL, bringing the first substrate S1 and the second substrate S2 into contact, and coupling the first substrate S1 and the second substrate S2.

In the coupling process of the first substrate S1 and the second substrate S2, in accordance with embodiments of the present disclosure, a first cell gap between the first substrate S1 and the second substrate S2 can be between from about 150 μm to 300 μm. In the coupling process of the first substrate S1 and the second substrate S2, a second cell gap between the first substrate S1 and the second substrate S2 can be between from about 20 µm to 30 µm.

In the coupling process of the first substrate S1 and the second substrate S2, in accordance with embodiments of the present disclosure, heat or light rays can be applied to accelerate curing of the sealant SLT of FIG. 4 that couples the first substrate S1 and the second substrate S2 together.

A method for coupling the first substrate and the second substrate using the apparatus for coupling substrates is described hereinbelow by referring to FIG. 1, FIG. 2a, FIG. 2b, FIG. 3 and FIG. 4.

First, support the second substrate S2 using the second chuck CK2 of the apparatus 500 for coupling substrates. As described above, the apparatus 500 can support the second substrate S2 on the second support surface CS2 using the second chucking member C2 provided to the second chuck CK2 and, more particularly, the second substrate S2 can be easily supported on the second support surface CS2 using the suction force transferred to the membrane MB of the second chucking member C2.

Then, nonpolar fluid (not illustrated) and polar fluid FL are applied onto the second substrate S2 supported on the second chuck CK2. In an embodiment of the present disclosure, the nonpolar fluid and the polar fluid FL can be applied onto the second substrate S2 using the nozzle 300 of FIG. 5.

The second substrate S2 is for an electrowetting display panel. The nonpolar fluid and the polar fluid FL provided on the second substrate S2 may be not mixed with each other, but rather the two may repel each other. Therefore, when the nonpolar fluid is provided into each and every of a plurality of pixel domains arranged and formed on the second substrate S2, and the polar fluid FL is provided onto the entire surface of the second substrate S2, a sufficient quantity of the polar fluid FL can be provided onto the second substrate S2 taking into consideration the volume of the polar fluid FL that overflows by the repelling force applied when coupling the first substrate S1 and the second substrate S2.

For example, to manufacture an electrowetting display panel having about 20 µm cell gaps, the nonpolar fluid is provided onto the second substrate S2 at a thickness of about 4 µm and the polar fluid FL is provided onto the second substrate S2 at a thickness of about 2 mm to 3 mm so that the polar fluid FL can be filled into the cell gap to a thickness of about 16 µm. In other words, only a very small portion of the polar fluid FL provided onto the second substrate S2 is filled in the cell gap and most of it overflows out.

Then, the nonpolar fluid (not illustrated) and the polar fluid FL are provided onto the second substrate S2 supported on the second chuck CK2, and the first substrate S1 is supported on the first support surface CS1 of the first chuck CK1. In an embodiment of the present disclosure, the first substrate S1 can be easily supported on the first support surface CS1 using the first chucking member C1 provided to the first chuck CK1.

Then, the first chuck CK1 is moved towards the second chuck CK2 by the drive member DM to couple the first substrate S1 with the second substrate S2. In an embodiment of the present disclosure, as illustrated in FIG. 2b, the first driver DR1 and the second driver DR2 are controlled in a manner such that the linear motion of the first drive shaft DA1 of the first driver DR1 and the linear motion of the second drive shaft DA2 of the second driver DR2 are implemented sequentially so that the first substrate S1 can be coupled with the second substrate S2 progressively from one end to the other. As a result, the air bubbles that may be formed in the polar fluid FL and the nonpolar fluid can be forced to move from one end to the other and removed with the surplus fluids easily.

As previously described, a portion of the polar fluid FL provided onto the second substrate S2 can overflow when the first substrate S1 and the second substrate S2 are coupled with each other. As illustrated in FIG. 4, the surplus polar fluid FL' overflowing from between the first substrate S1 and the second substrate S2 falls onto the bottom part BP of the second chuck CK2 or flows into the bottom part BP of the second chuck CK2 from along the side of the support part SP of the second chuck CK2.

The polar fluid FL flowing into the bottom part BP can be accommodated in the flow path FP and then discharged out via the drain hole DH and drain line DL. The polar fluid FL discharged out can be collected in a separate container for reuse. In this case, the effluent polar fluid FL can be filtered to remove foreign materials.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An apparatus comprising:
    a first chuck having a first support surface configured to support a first substrate;
    a first chucking member on a first portion of the first support surface and connected to a gas line, the first chucking member configured to hold the first substrate utilizing gas flow in the gas line;
    a hydrophobic material on a second portion of the first support surface, wherein the first chucking member and the hydrophobic material cooperatively form a common plane configured to directly receive the first substrate;
    a second support surface facing the first support surface configured to support a second substrate, wherein the second substrate includes a polar fluid and a nonpolar fluid; and
    a second chuck positioned beneath the first chuck;
    wherein the second support surface is smaller than the first support surface, and
    wherein the second support surface is positioned in a plane that is parallel to a plane that includes the first support surface.

2. The apparatus of claim 1, wherein the second chuck comprises: a drain portion having a flow path that is open towards the first chuck;
    a support part that includes the second support surface; and
    a bottom part that is positioned beneath the support part, wherein the flow path of the drain portion is formed as a groove at a predetermined depth from an upper surface of the bottom part that is exposed with respect to the first chuck.

3. The apparatus of claim 2, wherein:
    a drain hole is included on the drain portion; and
    the drain hole is connected to the flow path penetrating through the bottom part.

4. The apparatus of claim 2, wherein the flow path extends along a portion of the bottom part that is exposed with respect to the first chuck.

5. The apparatus of claim 2, wherein the support part has a tapered shape.

6. The apparatus of claim 2, further comprising a first jet on a side of the support part for dispensing fluid.

7. The apparatus of claim 6, wherein the first jet comprises a first hole coupled to a first feed line to dispense the fluid for washing the second chuck.

8. The apparatus of claim 7, further comprising a second jet, wherein the second jet comprises a second hole coupled to a second feed line to dispense at least one gas for drying the second chuck.

9. The apparatus of claim 1, further comprising a drive member that is coupled to the first chuck to move the first chuck relative to the second chuck, wherein the drive member comprises:
a first driver on one end of the first chuck; and
a second driver provided on the other end of the first chuck and that is driven independently from the first driver.

10. The apparatus of claim 1, further comprising a nozzle that dispenses the polar fluid into pixels of an electrowetting display panel.

11. The apparatus of claim 1, further comprising a press that is coupled to the first chuck to press the first chuck towards the second chuck.

12. The apparatus of claim 1, wherein the hydrophobic material is a lower portion of hydrophobic material, and the apparatus further includes an upper portion of hydrophobic material and a side portion of hydrophobic material between the upper portion of hydrophobic material and the lower portion of the hydrophobic material, wherein the upper portion of hydrophobic material and the side portion of hydrophobic material are isolated from the first chucking member and at least partially surround the first chucking member.

13. The apparatus of claim 12, wherein the side portion of hydrophobic material is positioned closer to an edge of the first support surface than to the first chucking member.

14. The apparatus of claim 1, wherein the second chuck further comprises:
a second gas line; and
a second chucking member on the second support surface and connected to the second gas line, the second chucking member to hold the second substrate utilizing gas flow in the second gas line.

15. The apparatus of claim 14, wherein the hydrophobic material on the second portion of the first support surface is a first hydrophobic material, wherein the second chuck further comprises a second hydrophobic material, and wherein the second hydrophobic material is isolated from the second chucking member and is formed on a surface of the second chuck that includes the second support surface.

16. The apparatus of claim 15, wherein the second hydrophobic material is positioned closer to an edge of the second support surface than to the second chucking member.

17. The apparatus of claim 1, wherein the first chucking member comprises a membrane that includes a plurality of openings that are connected to the gas line.

18. The apparatus of claim 17, wherein the first chucking member further comprises a diaphragm that is configured to move in response to a change of pressure in the gas line.

* * * * *